I. J. MENDELS.
ELECTRIC TOASTER.
APPLICATION FILED JAN. 31, 1920.
1,394,856. Patented Oct. 25, 1921.
2 SHEETS—SHEET 1.
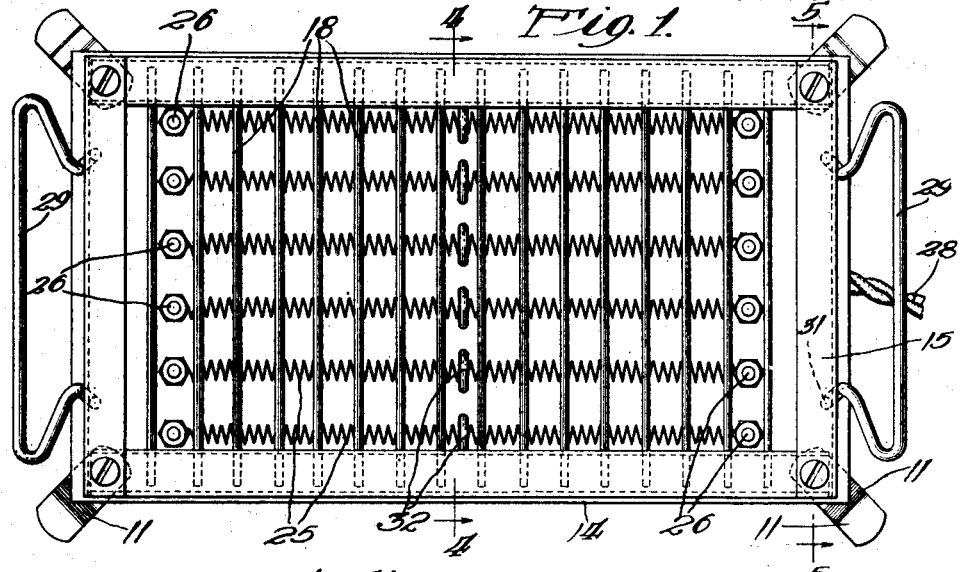
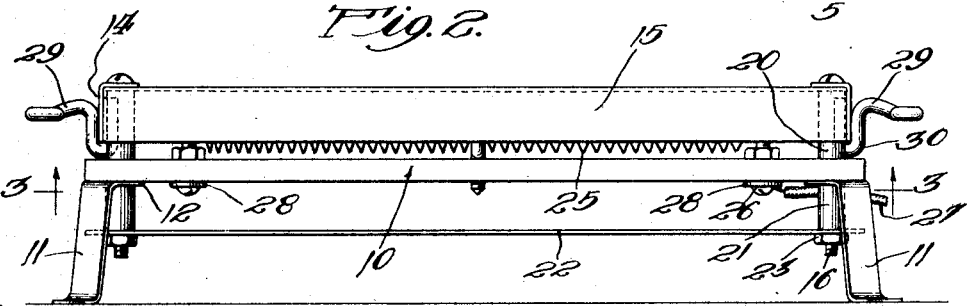
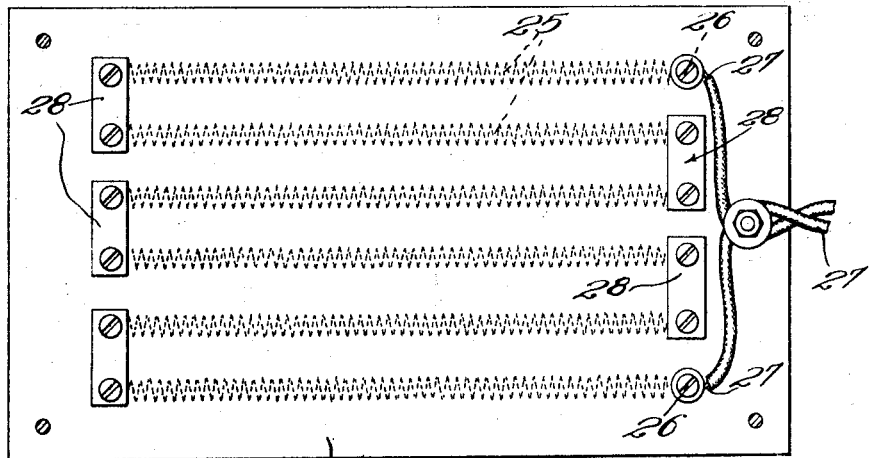
Witness
M. D. Robb
Inventor.
Irwin J. Mendels

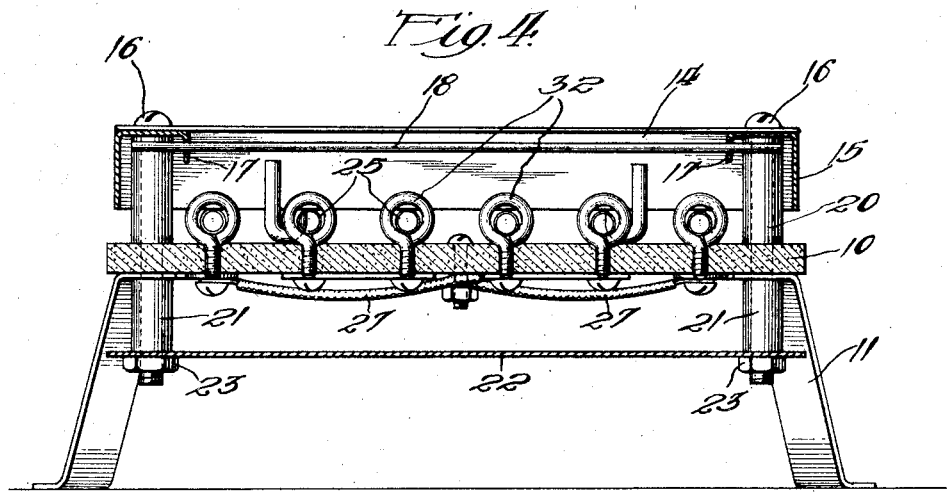
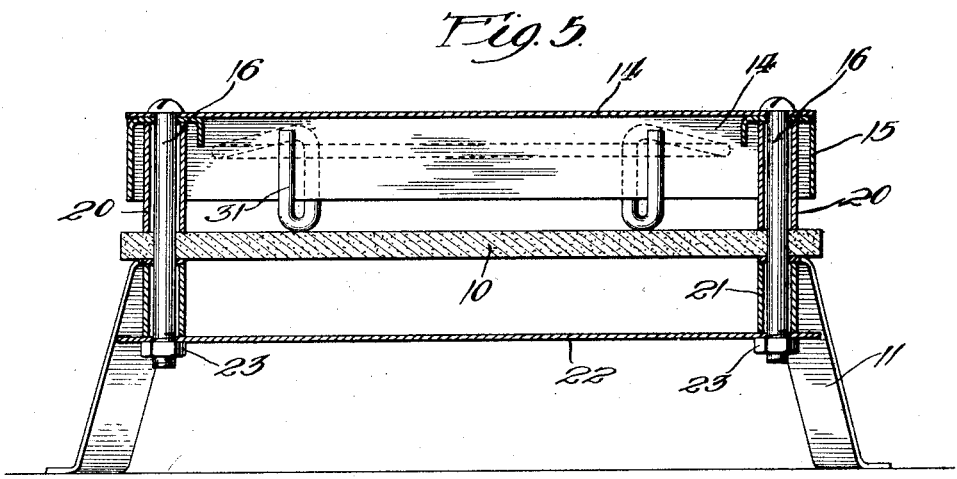

UNITED STATES PATENT OFFICE.

IRWIN J. MENDELS, OF CHICAGO, ILLINOIS, ASSIGNOR TO EMPIRE TRANSFORMER COMPANY, OF CHICAGO, ILLINOIS, A CORPORATION OF ILLINOIS.

ELECTRIC TOASTER.

1,394,856.  Specification of Letters Patent.  Patented Oct. 25, 1921.

Application filed January 31, 1920. Serial No. 355,476.

*To all whom it may concern:*

Be it known that I, IRWIN J. MENDELS, a citizen of the United States, and a resident of Chicago, in the county of Cook and State of Illinois, have invented certain new and useful Improvements in Electric Toasters; and I do hereby declare that the following is a full, clear, and exact description thereof, reference being had to the accompanying drawings, and to the characters of reference marked thereon, which form a part of this specification.

This invention relates to improvements in electric toasters, and refers both to improvements in the electric heating elements and also in the general construction of the frame of the toaster and the means for holding the parts of the frame assembled. One of the objects of the invention is to provide in a toaster or electric heating device of this character a form and arrangement of the heating unit wherein said heating unit is made of a plurality of elements which, when the toaster is in use, are connected together and which, due to the resistance of said elements, serve, when current is conveyed therethrough, to throw off heat to toast or otherwise treat bread or other food material supported in close adjacency thereto, said heating elements being so inserted in the circuit that upon failure of one of the elements it may be readily removed and another substituted therefor, so that by the replacement of an element that has been impaired the toaster becomes effective to operate at its full capacity.

Another object of the invention is to provide a novel construction of toaster so arranged that separable heating elements may be thus applied to and detached from the structure without interfering with other heating elements or other connections or without dismantling the toaster structure.

A further object of the invention is to provide a novel construction of electric toaster frame so arranged as to enable the frame to be fabricated by the use of simple machinery and to be readily assembled by unskilled labor.

Other objects of the invention are to generally improve, simplify, and reduce the cost of toasters of this character, and the invention consists in the combination and arrangement of the parts shown in the drawings and described in the specification, and is pointed out in the appended claims.

As shown in the drawings;

Figure 1 is a top plan view of an electric toaster embodying my invention.

Fig. 2 is an edge elevation thereof.

Fig. 3 is a horizontal section indicated by the section line 3—3 of Fig. 2, looking upwardly.

Figs. 4 and 5 are cross sections on the lines 4—4 and 5—5 of Fig. 1.

As shown in the drawings, 10 designates a horizontally, relatively thick heat insulating element or board and may be made of asbestos composition. 11, 11 designates supporting legs at the corners of said board 10. They are provided at their lower ends with outstanding feet and at their upper ends with instanding lugs 12 which fit under the board or element 10 at its ends. The legs are attached to the structure in a manner hereinafter disclosed. Above said insulating board or element 10 is arranged a frame which is made up of end and side channel pieces 14, 15, respectively, the webs of which depend vertically and the flanges of which overlap at the corners of the structure and are secured together by bolts 16 which also serve, as in the structure shown, as the means for attaching the legs 11 to the toaster structure.

The end and side angle pieces 14 and 15 constitute an open rectangular frame. The side angle pieces are provided at the inner sides of their flanges with narrow downturned lips 17 which support a plurality of closely spaced rods or bars 18 that extend transversely across and above the insulating board 10, the lips 17 being formed with openings to receive the ends of the bars 18, as best shown in Figs. 1 and 4.

The said rods or bolts 16 are surrounded between the board 10 and frame, constituted by the angle bars 14 and 15 with spacing sleeves 20 which constitute spacing means to separate and hold apart in a rigid manner said open frame and the insulating board 10. The said bolts 16 are likewise surrounded below the insulating board 10 with other spacing sleeves 21 which bear at their lower ends against a solid metal screen plate 22 that is made of the same plan section as the insulating board 10 and is provided at its corners to receive the lower threaded ends of the bolts 16, nuts 23 being threaded to said bolts to hold the screen plate in place. Said nuts act in conjunction with the spacing sleeves 21 which bear at their upper ends against the inturned members 12 of the legs 11 to rigidly connect said legs to the insulating board and thereby to the toaster frame structure as a whole.

25, 25 designate a plurality of heating elements herein shown as formed of spiral wire, having the necessary resistance properties to be heated when current is passed therethrough. The said heating elements are made of single and uniform lengths and are severally attached at their ends to binding screws 26 that pierce openings in the insulating board 10. The ends of two of said binding screws 26 are adapted for connection to the circuit wires 27 of the cord. The other binding screws are severally connected at the respective ends of the insulating board by short metal conducting bars 28 which are so associated with each other and with the heating elements as to cause the current to pass through the heating elements in series.

29, 29 designate handles for the toaster structure which are shown as made of wire, being elongated in the width of the toaster. They are provided at their ends with terminal hooks 30 embracing the lower edges of the end angle bars 14 of the frame; and the terminals 31 of said hooks are out of line with the portions of the hooks exterior to said angle bars, so as to thereby afford, when the hooks are pressed against the flanges of the end angle bars, a firm connection between the handles and frame structure. The arrangement of the terminals of said hooks out of line with their main portions has also the effect to afford a binding action between the hook members and the angle bar flanges, as will be readily apparent from an inspection of Fig. 1.

It will be noted that I have provided a construction in which the frame is made up of few simple parts and that the structure is such that the parts may be readily assembled and disassembled so that in the event of injury to any of the parts the frame structure as a whole may be readily taken apart by an inexperienced person and as readily put together.

Another advantage of the construction shown is that the heating elements or coils 25, being severally connected at their ends to their respective binding posts 26 and plates 28, may be severally removed from the structure in the event that one of the heating elements be burned out or is otherwise injured. Therefore, by initially furnishing a number of these separate heating elements, as the coils 25, with the toaster, the user may quickly repair a burned-out heating unit, thus avoiding the expense and delay in sending the toaster out for repairs.

Preferably, and when the heating units 25 are of considerable length, they may be supported intermediate their ends by eyelets 32 that are screwed into the insulating board 10 between the ends of the latter and through which said coils or heating units extend, as best shown in Figs. 1 and 4.

It will be understood that the invention may be embodied in structures which differ in some respects from that which is illustrated without departing from the spirit and scope of the invention and that the invention is, therefore, not limited to the illustrated structure except as to claims wherein the specific structure is set out and as imposed by the prior art.

I claim as my invention:

1. An electric toaster heating unit comprising elements constituting fractional lengths of the unit having means to connect them to a source of electrical energy, and means at each end of each length to permit separate removal of said length from and its replacement in said unit.

2. An electric toaster heating unit comprising a plurality of coiled resistance elements having means at their ends to connect them to a source of energizing current so as to be in series, the connecting means of each of said elements being removably fixed to the toaster structure and to its series connection so as to be removable without disturbing other elements.

3. An electric toaster comprising, in combination with a frame and a support for the material to be toasted, of an electrical resistance unit comprising a series of fractional length resistance elements separately connected in series with each other and to an energizing circuit.

4. An electric toaster comprising a frame, a support for the material to be toasted and a heating unit composed of elements fractionally constituting said unit, said elements being separately and detachably fixed to the toaster structure, and connected to an external circuit.

5. An electric toaster comprising an insulating board, legs attached thereto, an open frame fixed to the board, transverse bars fixed in and supported by and extending across said open frame, and a resistance unit supported on said board beneath said bars and connected to an energizing circuit, said unit being composed of a plurality of fractional length elements, with means to separately remove and attach them in place.

6. An electric toaster comprising a top open frame, bars extending across the open frame and seated in the members thereof, an insulating board below said frame, supporting feet for the toaster having inturned parts extending beneath said board, headed bolts extending through said open frame, said board, and the inturned parts of said legs, spacing sleeves around said bolts above and below said board, said bolts being threaded at their ends opposite their heads, nuts threaded to said bolts to lock the parts together, and a heating unit supported on said board and having means to connect it to an energizing circuit.

7. An electric toaster comprising a top open frame, bars extending across the open frame and seated in the members thereof, an insulating board below said frame, supporting feet for the toaster having inturned parts extending beneath said board, headed bolts extending through said open frame, said board, and the inturned parts of said legs, spacing sleeves around said bolts above and below said board, said bolts being threaded at their ends opposite their heads, nuts threaded to said bolts to lock the parts together, a heating unit supported on said board and having means to connect it to an energizing circuit, and a screen plate below said insulating board and supported on said bolts by said nuts.

8. An electric toaster comprising a horizontal insulating board, legs therefor, an open frame above the board comprising bars overlapped at the corners of the board, supporting rods in opposite frame members and extending across the open frame, headed bolts extending through the overlapping members of the open frame, the board, and through sleeves surrounding said bolts between said board and open frame and between said board and said legs, the lower ends of the bolts being threaded, and nuts engaging said bolts to fasten the parts together as a unitary structure.

9. An electric toaster comprising a horizontal insulating board, legs therefor, an open frame above the board comprising bars overlapped at the corners of the board, rods supported in opposite frame members and extending across the open frame, headed bolts extending through the overlapping members of the open frame, the board, and through sleeves surrounding said bolts between said board and open frame and between said board and said legs, the lower ends of the bolts being threaded, nuts engaging said bolts to fasten the parts together as a unitary structure, and a heating unit supported on said board comprising a series of parallel resistance elements separately connected to binding posts supported by said board, said binding posts being accessible for separate removal of said elements.

In witness whereof I claim the foregoing as my invention, I hereunto append my signature this 3rd day of January, 1920.

IRWIN J. MENDELS.